G. MAYERLE.
EYEGLASS SHIELD.
APPLICATION FILED JULY 11, 1917.

1,335,517. Patented Mar. 30, 1920.

WITNESS:
Charles Rickles
Julius C. Benesch

INVENTOR.
George Mayerle,
BY Strong & Townsend,
ATTORNEYS.

UNITED STATES PATENT OFFICE.

GEORGE MAYERLE, OF SAN FRANCISCO, CALIFORNIA.

EYEGLASS-SHIELD.

1,335,517.  Specification of Letters Patent.  Patented Mar. 30, 1920.

Application filed July 11, 1917. Serial No. 179,846.

*To all whom it may concern:*

Be it known that I, GEORGE MAYERLE, a citizen of the United States, residing at the city and county of San Francisco and State of California, have invented new and useful Improvements in Eyeglass-Shields, of which the following is a specification.

This invention relates to an eye glass shield.

The object of the present invention is to provide an eye glass shield which is simple in construction, cheap to manufacture and designed in such a manner that it may be readily and quickly applied to any of the standard forms of glasses now used. This shield may be constructed of any suitable material, such as celluloid, and the like; it may have any color desired such as yellow, blue, green or white, and may be used to protect the eyes from strong light, or by mechanics to protect the lenses proper from being scratched or broken, and the eyes from injury, as will hereinafter be more fully described.

The invention consists of the parts and the construction and combination of parts as hereinafter more fully described and claimed, having reference to the accompanying drawings, in which—

Figure 1:
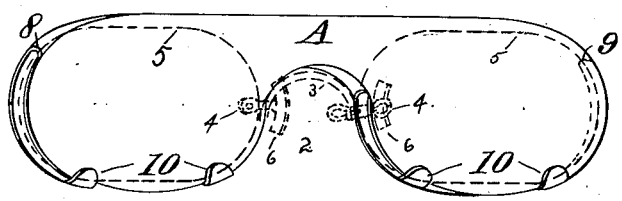
Figure 1 is a rear perspective, showing the application of the eye glass shields to a pair of standard glasses, the glasses being shown in dotted lines.

Referring to the drawings in detail, A indicates generally a pair of eye glass shields which are adapted to any standard form of eye glasses. The center portion of the shield is cut away as at 2, to fit the bridge of the nose and to clear the guard indicated at 3, said guard carrying the usual forked member on each end thereof, as indicated at 4, whereby the lenses of the glasses, indicated by the dotted lines 5, are supported. The shields are otherwise cut to conform to the general outline or shape of the glasses as a whole and as is obvious, the nose grips, as indicated at 6, which are pivotally mounted in the usual manner on the ends of the guard tree, are free for outward and inward movement.

Figure 2:
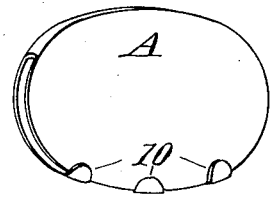
Fig. 2 is a similar view of a modification.

The shields are made of a single section which is folded over to form a connector between the two shields, said connector extending from the point 8 to the opposite side 9. These rounded extensions 8—9, secure the shield against lateral movement upon the lens while flexible clips 10, formed either on one side or the other, preferably on the outer shield, permit the lower edges to be snapped and secured together, thereby locking the shield against removal or displacement in an upward direction. While a unitary double shield is shown in Fig. 1, it is obvious that a single shield such as shown in Fig. 2, may be applied to each individual lens.

When it is desired to place the shield over the glasses, it is only necessary to open or spread the shields apart sufficiently for slipping them down over the lens and over the forked members 4, by which the lens 5 are secured to the guard 3. The flexible clips 10 carried by the outer shield may then be snapped over the inner shield and the shield as a whole locked against removal or displacement. Also, the lens of the glasses are clamped between the shields and held against movement with relation thereto.

The shield serves several functions; being made of celluloid or similar comparatively flexible transparent material, it is obvious that it may be given any color desired; for instance, yellow, blue, green or any shades thereof, thus permitting the glasses to be used as sun glasses or in connection with any work where a bright light is encountered, and where it is desired to protect the eyes. The shield may also be employed by mechanics in varied arts, not only to protect the lenses from becoming scratched and broken but also to prevent broken pieces from the lenses from entering the eyes.

The utility of a shield of this character, when used, can readily be understood when it is taken into consideration that mechanics working around lathes or grinding wheels, often wear glasses merely for the purpose of protecting the eyes from flying fragments; these fragments, when they strike the lenses, often scratch and fracture the same to such an extent that they become more or less useless. Such injury is in the present instance obviated as new shields are so cheap that they can be replaced from time to time.

Again, the shields are particularly useful where there is danger of the glasses being broken; that is, breakage of the lens in the glass cannot possibly injure the eye when this shield is applied as the fragments will be held together by the double shield sections and, if anything, can only drop out between the shields in a downward direction, thereby preventing the eye proper from being injured.

While two forms of the shield are here shown, it is obvious that other modifications may be devised. I therefore wish it understood that I do not limit the invention to the form here shown but that I desire to cover it as broadly as the scope of the claims permits; I similarly wish it understood that the materials and finish of the several parts employed may be such as the experience and judgment of the manufacturer may dictate.

Having thus described my invention what I claim and desire to secure by Letters Patent is—

1. The combination with a pair of eye glasses, of a shield member adapted to cover the inner and exterior surface of the glasses, and means on the shield for engaging the upper and lower edges of the glasses to secure the shield against removal.

2. The combination with a pair of eye glasses, of a shield member adapted to cover the inner and exterior surfaces of the glasses and prongs formed on the lower edges of one shield section adapted to encompass the lower edges of the opposite shield section to secure said shield member against removal.

3. The combination with a pair of eye glasses, of a pair of shield members adapted to cover the inner and exterior surface of the glasses, said shield members being connected along their upper edge and means for securing the lower edges together to secure the shield sections against accidental removal.

4. The combination with a pair of eye glasses, of a pair of shield members adapted to cover the inner and exterior surface of the glasses, said shield members being connected along their upper edge and means for securing the lower edges together to secure the shield sections against accidental removal, said means comprising flexible clips forming a continuation of one of the shield sections and adapted to embrace the lower edge of the opposite shield section.

5. A shield for eye glasses consisting of a pair of shield members flexibly connected to each other along one edge and adapted to cover the inner and outer surface of the glasses, and means carried by the free ends of said flexibly connected members for securing said ends together and clamping the eye glass lenses therebetween.

6. A shield for eye glasses consisting of shield members in pairs connected together and each pair foldable to inclose one lens between its members, said members having means to clamp their separate edges together and to secure them to the lenses.

In testimony whereof I have hereunto set my hand.

GEORGE MAYERLE.